United States Patent
Boualleg et al.

(10) Patent No.: US 10,392,570 B2
(45) Date of Patent: *Aug. 27, 2019

(54) METHOD FOR THE HYDROTREATMENT OF DISTILLATE CUTS USING A CATALYST MADE FROM AN AMORPHOUS MESOPOROUS ALUMINA HAVING HIGH CONNECTIVITY

(71) Applicant: IFP Energies nouvelles, Rueil-Malmaison (FR)

(72) Inventors: Malika Boualleg, Villeurbanne (FR); Antoine Hugon, Givors (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 24 days.

This patent is subject to a terminal disclaimer.

(21) Appl. No.: 15/318,598

(22) PCT Filed: Jun. 9, 2015

(86) PCT No.: PCT/EP2015/062826
§ 371 (c)(1),
(2) Date: Dec. 13, 2016

(87) PCT Pub. No.: WO2015/189200
PCT Pub. Date: Dec. 17, 2015

(65) Prior Publication Data
US 2017/0130142 A1  May 11, 2017

(30) Foreign Application Priority Data

Jun. 13, 2014 (FR) .................................. 14 55425

(51) Int. Cl.
| | |
|---|---|
| *C10G 45/08* | (2006.01) |
| *B01J 37/03* | (2006.01) |
| *B01J 21/12* | (2006.01) |
| *B01J 27/16* | (2006.01) |
| *B01J 35/10* | (2006.01) |
| *B01J 37/08* | (2006.01) |
| *B01J 23/88* | (2006.01) |
| *B01J 23/882* | (2006.01) |

(Continued)

(52) U.S. Cl.
CPC .............. *C10G 45/08* (2013.01); *B01J 21/04* (2013.01); *B01J 21/12* (2013.01); *B01J 23/88* (2013.01); *B01J 23/882* (2013.01); *B01J 23/883* (2013.01); *B01J 23/888* (2013.01); *B01J 27/16* (2013.01); *B01J 27/19* (2013.01); *B01J 35/1014* (2013.01); *B01J 35/1019* (2013.01); *B01J 35/1038* (2013.01); *B01J 35/1042* (2013.01); *B01J 35/1057* (2013.01); *B01J 35/1061* (2013.01); *B01J 35/1066* (2013.01); *B01J 35/1071* (2013.01); *B01J 35/1076* (2013.01); *B01J 37/009* (2013.01); *B01J 37/0236* (2013.01); *B01J 37/031* (2013.01); *B01J 37/036* (2013.01); *B01J 37/08* (2013.01); *B01J 37/088* (2013.01); *C10G 45/50* (2013.01); *C10G 2300/1074* (2013.01)

(58) Field of Classification Search
CPC ............ C10G 45/50; C10G 2300/1074; C10G 69/04; B01J 35/1057; B01J 35/1038; B01J 35/1042; B01J 35/1061; B01J 21/04; B01J 21/12; B01J 27/16; B01J 27/19; B01J 23/88; B01J 23/882; B01J 23/883; B01J 23/888; B01J 35/1014; B01J 35/1019; B01J 35/1076; B01J 35/1071; B01J 35/1066; B01J 37/08; B01J 37/031; B01J 37/036; B01J 37/0236; B01J 37/088; B01J 37/009
See application file for complete search history.

(56) References Cited

U.S. PATENT DOCUMENTS

2006/0289338 A1* 12/2006 Gueret .................... C10G 11/18
208/67
2009/0044444 A1* 2/2009 Sugano ................... C10G 47/02
44/300
(Continued)

FOREIGN PATENT DOCUMENTS

| FR | 2972648 A1 | 9/2012 |
|---|---|---|
| WO | 00/41811 A1 | 7/2000 |

OTHER PUBLICATIONS

International Search Report dated Aug. 10, 2015, issued in corresponding PCT/EP2015/062826, 12 pages.
(Continued)

*Primary Examiner* — Prem C Singh
*Assistant Examiner* — Brandi M Doyle
(74) *Attorney, Agent, or Firm* — Millen White Zelano & Branigan, PC

(57) ABSTRACT

A description is given of a process for hydrotreatment of at least one hydrocarbon feedstock having a weighted average temperature (WAT) of more than 380° C. using at least one catalyst containing at least one metal from Group VIB and/or at least one metal from Group VIII of the periodic table and a support containing an amorphous mesoporous alumina having a connectivity (Z) of more than 2.7, said hydrotreatment process operating at a temperature of between 250° C. and 430° C., at a total pressure of between 4 MPa and 20 MPa with a ratio of volume of hydrogen to volume of hydrocarbon feedstock of between 200 and 2 000 liters per liter and at an Hourly Volume Velocity (HVV) defined by the ratio of the volume flow of liquid hydrocarbon feedstock to the volume of catalyst fed into the reactor of between 0.5 and 5 $h^{-1}$.

31 Claims, No Drawings

(51) Int. Cl.
*B01J 23/883* (2006.01)
*B01J 23/888* (2006.01)
*B01J 21/04* (2006.01)
*B01J 27/19* (2006.01)
*B01J 37/00* (2006.01)
*B01J 37/02* (2006.01)
*C10G 45/50* (2006.01)

(56) References Cited

U.S. PATENT DOCUMENTS

| 2011/0000824 | A1 | 1/2011 | Zhan et al. |
| 2012/0122659 | A1 | 5/2012 | Kuperman et al. |
| 2014/0076780 | A1 | 3/2014 | Guichard et al. |
| 2014/0367311 | A1* | 12/2014 | Yu ............................ B01J 21/12 208/213 |

OTHER PUBLICATIONS

Liu, H. et al., "Determination of the Connectivity of Porous Solids From Nitrogen Sorption Measurements—II. Generalisation", Chemical Engineering Science, vol. 47, No. 17/18, 1992, pp. 4393-4404.
English translation Abstract of FR2972648A1 published Sep. 21, 2012 (2 pages).

* cited by examiner

METHOD FOR THE HYDROTREATMENT OF DISTILLATE CUTS USING A CATALYST MADE FROM AN AMORPHOUS MESOPOROUS ALUMINA HAVING HIGH CONNECTIVITY

TECHNICAL FIELD

The invention relates to processes for hydrotreatment of hydrocarbon feedstocks having a weighted average temperature (WAT) of more than 380° C. By preference, the hydrocarbon feedstock employed in the process according to the invention is a feedstock of the vacuum distillate (VD) type.

The purpose of the process according to the invention is essentially the purification of said hydrocarbon feedstocks and in particular of distillates.

The invention relates in particular to the use in a process for hydrotreatment of a hydrocarbon feedstock having a weighted average temperature (WAT) of more than 380° C., of a catalyst containing at least one metal from Group VIB and/or at least one metal from Group VIII of the periodic table, a support containing an amorphous mesoporous alumina having a very high connectivity and advantageously a pore size distribution distinct from aluminas of the prior art. Said amorphous mesoporous alumina is advantageously shaped from an alumina gel having a high dispersibility, said alumina gel itself being obtained by precipitation of at least one aluminium salt according to a specific process.

More specifically, the invention relates to the use in a process for hydrotreatment of said hydrocarbon feedstock of a catalyst containing a support containing an amorphous mesoporous alumina formed from an alumina gel, said alumina gel being prepared according to a specific process of preparation by precipitation, allowing at least 40 wt. % as equivalent $Al_2O_3$ to be obtained in relation to the total quantity of alumina formed in the precipitation steps and more generally in the alumina gel preparation steps, since the first precipitation step, the quantity of alumina formed in the first precipitation step possibly even reaching 100%.

PRIOR ART

It is generally accepted that a hydrotreatment catalyst having a strong catalytic potential is characterised by an optimised hydro-dehydrogenating function, that is to say an active phase perfectly dispersed at the surface of the support and having a high metal content. Ideally, whatever the type of hydrocarbon feedstock to be treated, the catalyst must be able to demonstrate accessibility to active sites in relation to the reagents and reaction products while developing a high active surface area, which leads to particular constraints in terms of the structure and texture specific to the oxide support of which said catalysts is made up.

The composition and use of conventional catalysts for hydrotreatment of feedstocks are comprehensively described in the publication "Hydrocracking Science and Technology", 1996, J. Scherzer, A. J. Gruia, Marcel Dekker Inc and in the article by B. S. Clausen, H. T. Topsøe, F. E. Massoth, from the publication "Catalysis Science and Technology", 1996, volume 11, Springer-Verlag. Thus, these catalysts are generally characterised by the presence of at least one metal from Group VIB and/or at least one metal from Group VIII of the periodic table of the elements. The most common formulations are of the cobalt-molybdenum (CoMo), nickel-molybdenum (NiMo) and nickel-tungsten (NiW), types. These catalysts may be present in solid form or also in supported form with a porous solid of a different kind then being involved. In the latter case, the porous support is generally an amorphous or poorly crystallised oxide such as for example an alumina, or an aluminosilicate, possibly associated with a zeolithic or non-zeolithic material. Following preparation, the Group VIB metal and/or the Group VIII metal making up said catalyst(s) is or are often present in oxide form. The active and stable form of said catalysts for the hydrotreatment processes being the sulphurous form, these catalysts must undergo a sulphurisation step. This can be performed in the unit of the associated process and is then referred to as sulphurisation in-situ, or prior to the feeding of catalyst into the unit and is then referred to as sulphurisation ex-situ.

The normal methods leading to the formation of the active phase of the hydrotreatment catalysts consist of the depositing of a molecular precursor or molecular precursors of at least one Group VIB metal and/or at least one Group VIII metal on an oxide support using the technique known as dry impregnation followed by maturation, drying and calcination leading to the formation of the oxide form of said metal(s) employed. Then comes the final step of sulphurisation generating the active phase as mentioned above.

U.S. Pat. No. 7,790,652 in particular describes a new alumina support having a quite specific pore size distribution, that can be used as a catalyst support in a process for hydroconversion of heavy hydrocarbon feedstocks. Said support containing alumina has a mean pore diameter of between 100 and 140 Å, a pore size distribution width of at least 33 Å, and a pore volume of at least 0.75 ml/g in which at least 5% of the pore volume of said support is present in the pores having a diameter of greater than 210 Å.

Said support used in combination with a hydrogenating active phase allows unexpected catalytic performances to be obtained where used in the hydroconversion of heavy feedstocks preferably having a major proportion of their components boiling at a temperature of more than 343° C. In particular, the process of hydroconversion of heavy feedstocks according to U.S. Pat. No. 7,790,652 allows a conversion to be achieved of the hydrocarbon components with a boiling temperature of more than 524° C. which is much improved compared with the conversions obtained with the conventional catalysts of the prior art.

Said alumina support is prepared according to a method comprising a first step of formation of an alumina dispersion by the mixing, in a controlled manner, of a first alkaline aqueous solution and a first acid aqueous solution, at least one of acid and basic solutions, or both, containing an alumina compound. The acid and basic solutions are mixed in proportions such that the pH of the resultant dispersion is between 8 and 11. The acid and basic solutions are also mixed in quantities allowing a dispersion to be obtained containing the desired quantity of alumina; in particular, the first step allows 25 to 35 wt. % of total alumina made by the two-step precipitation process to be obtained. The first step operates at a temperature of between 20 and 40° C. When the desired quantity of alumina has been formed, the temperature of the suspension is increased to a temperature of between 45 and 70° C., then the heated suspension undergoes a second precipitation step by bringing said suspension into contact with a second alkaline aqueous solution and a second acid aqueous solution, at least one of the two solutions or both solutions containing an aluminium compound. Similarly, the pH is adjusted to between 8 and 10.5 by the proportions of the acid and basic solutions added and the remaining quantity of alumina to be formed in the second step is provided by the quantities of the second acid and basic solutions added. The second step operates at a temperature of between 20 and 40° C. The alumina gel formed in this way comprises at least 95% boehmite. The dispersibility of the alumina gel obtained in this way is not mentioned. The alumina gel is then filtered, washed and possibly dried according to the methods known to a person skilled in the art, without a prior thermal treatment or maturing step, to produce an alumina powder which is then shaped according to the methods known to a person skilled in the art and then calcined to produce the final alumina support.

The first precipitation step of the process of preparation of U.S. Pat. No. 7,790,652 is limited to a low production of alumina, of between 25 and 35 wt. %, for higher production of alumina in the first step does not allow optimal filtration of the gel obtained. Furthermore, the increase in production of alumina in the first step of U.S. Pat. No. 7,790,652 would not allow the shaping of the gel thereby obtained.

The applicant has discovered that the use in a hydrotreatment process of at least one carbonated feedstock having a weighted average temperature (WAT) of more than 380° C., of at least one catalyst containing at least one metal from Group VIB and/or at least one metal from Group VIII of the periodic table and a support containing an amorphous mesoporous alumina having a very high connectivity, allowed an improved catalytic activity to be obtained compared with hydrotreatment catalysts of the prior art. In particular, in the case of said process according to the invention being positioned upstream of a unit for hydrocracking of said feedstock, the process according to the invention using said catalyst(s) containing the specific alumina support allows better deazotisation of said feedstock than the processes of the prior art using conventional hydrotreatment catalysts, and better hydrogenation of the aromatics contained in said feedstock. Similarly, in the case of said process according to the invention being positioned upstream of a unit for fluidised bed catalytic cracking of said feedstock, the process according to the invention using said catalyst(s) containing the specific alumina support allows better desulphurisation of said feedstock than the processes of the prior art.

An object of the invention is therefore to provide a process for hydrotreatment of at least one hydrocarbon feedstock having a weighted average temperature (WAT) of more than 380° C. employing at least one catalyst presenting improved catalytic performances, in particular in terms of deazotisation of said feedstock and hydrogenation of the aromatics contained in said feedstock in the case of said hydrotreatment process according to the invention being positioned upstream of a unit for hydrocracking said feedstock and in terms of hydrodesulphurisation of said feedstock where said process according to the invention is positioned upstream of a unit for fluidised bed catalytic cracking of said feedstock.

SUMMARY AND ADVANTAGE OF THE INVENTION

The object of the invention is a process for hydrotreatment of at least one hydrocarbon feedstock having a weighted average temperature (WAT) of more than 380° C. using at least one catalyst containing at least one metal from Group VIB and/or at least one metal from Group VIII of the periodic table and a support containing an amorphous mesoporous alumina having a connectivity (Z) of more than 2.7, the connectivity being determined on the basis of the nitrogen adsorption/desorption isotherms, said hydrotreatment process operating at a temperature of between 250° C. and 430° C., at an overall pressure of between 4 MPa and 20 MPa with a ratio of volume of hydrogen to volume of hydrocarbon feedstock of between 200 and 2 000 liters per liter and an Hourly Volume Velocity (HVV) defined by the ratio of the volume flow of liquid hydrocarbon feedstock to the volume of catalyst fed into the reactor of between 0.5 and 5 $h^{-1}$.

One of the advantages of the invention is the employment in a process for hydrotreatment of at least one hydrocarbon feedstock having a weighted average temperature (WAT) of more than 380° C., of a catalyst based on a support containing an alumina, the porosity of which is highly connected, that is to say having a very large number of pores adjacent to a given pore. A high connectivity represents a major advantage for the diffusion of the molecules of said feedstock to be treated when the hydrotreatment process according to the invention is implemented using this material. A better diffusion of the reagents allows a more homogenous concentration to be arrived at within the catalyst thus allowing a greater majority of the catalytic sites to work at their fullest potential.

Throughout the text that follows, the connectivity of the alumina according to the invention is defined as being the number of pores adjacent to a given pore. The connectivity of the alumina according to the invention is representative of the total porosity of the alumina and in particular the total mesoporosity of the alumina, that is to say the totality of the pores having a mean diameter of between 2 and 50 nm.

Connectivity is a relative magnitude measured according to the procedure described in the publication by Seaton (Liu H., Zhang L., Seaton N. A., Chemical Engineering Science, 47, 17-18, pp. 4393-4404, 1992). This involves a Monte-Carlo simulation based on nitrogen adsorption/desorption isotherms. These connectivity parameters are based on percolation theory. Connectivity is associated with the numbers of adjacent pores and a high connectivity is an advantage for diffusion during the catalytic reactions of the molecules to be treated.

Another object of the invention is also a process for hydrotreatment of at least one hydrocarbon feedstock having a weighted average temperature (WAT) of more than 380° C., operating at a temperature of between 250° C. and 430° C., at a total pressure of between 4 MPa and 20 MPa with a ratio of volume of hydrogen to volume of hydrocarbon feedstock of between 200 and 2 000 liters per liter and an Hourly Volume Velocity (HVV) defined by the ratio of the volume flow of liquid hydrocarbon feedstock to the volume of catalyst fed into the reactor of between 0.5 and 5 $h^{-1}$, said process using at least one catalyst containing at least one metal from Group VIB and/or at least one metal from Group VIII of the periodic table and a support containing an amorphous mesoporous alumina, said alumina being prepared according to at least the following steps:

a) at least one first step a) of alumina precipitation, in aqueous reaction medium, of at least one basic precursor selected from among sodium aluminate, potassium aluminate, ammonia, sodium hydroxide and potassium hydroxide and at least one acid precursor selected from among aluminium sulphate, aluminium chloride, aluminium nitrate, sulphuric acid, hydrochloric acid and nitric acid, in which at least one of the basic or acid precursors contains aluminium, the relative flow of the acid and basic precursors is selected in order to obtain a pH of the reaction medium of between 8.5 and 10.5 and the flow of the acid and basic precursor(s) containing aluminium is adjusted in order to obtain a rate of progress of the first step of between 40 and 100%, the rate of progress being defined as being the alumina formed as equivalent $Al_2O_3$ in said precipitation step a) as a proportion of the total quantity of alumina formed in the precipitation step(s) and more generally in the alumina gel preparation steps, said step a) operating at a temperature of between 10 and 50° C., and for a period of between 2 minutes and 30 minutes, b) a step for thermal treatment of the suspension obtained in step a), at a temperature of between 50 and 200° C. for a period of between 30 minutes and 5 hours, c) a step for filtration of the suspension obtained from thermal treatment step b), followed by at least one washing step of the gel obtained, d) a step for drying the alumina gel obtained in step c) for obtaining a powder, e) a step for shaping the powder obtained in step d) for obtaining the raw material, f) a step for thermal treatment of the raw material obtained in step e) at a temperature of between 500 and 1 000° C., in the presence or not of an air flow containing up to 60 vol. % of water.

An advantage of the invention is that it provides a hydrotreatment process using a catalyst, the alumina support of which is prepared according to a quite specific preparation process, allowing the shaping of a highly dispersible alumina gel, itself prepared on the basis of a precipitation step in which at least 40 wt. % of alumina as $Al_2O_3$ equivalent in relation to the total quantity of alumina formed in said gel preparation process, is formed since the first precipitation step. This process is carried out thanks to the implementation of a thermal treatment step and in particular a maturation step allowing an alumina gel to be obtained having improved filterability, and facilitating its shaping.

Definitions and Measurement Methods

Throughout the text that follows, the dispersibility index is defined as the percentage by weight of peptised alumina gel that can be dispersed by centrifugation in a polypropylene tube at 3 600G for 10 min.

The dispersibility is measured by dispersing 10% boehmite or alumina gel in an aqueous suspension also containing 10% nitric acid in relation to the weight of boehmite. The suspension is then centrifuged at 3 600G rpm for 10 min. The sediments collected are dried at 100° C. overnight and then weighed.

The index of dispersibility, with notation ID, is obtained by the following calculation: ID(%)=100%−weight of dried sediments (%).

Throughout the text that follows, the connectivity of the alumina used as a catalyst support or of the catalyst used in the process according to the invention is defined as being the number of pores adjacent to a given pore. The connectivity according to the invention determined on the basis of the nitrogen adsorption/desorption isotherms, is representative of the total porosity of the alumina or of the catalyst and in particular of the total mesoporosity of the alumina, that is to say of the total pores having a mean diameter of between 2 and 50 nm.

Connectivity is a relative magnitude measured according to the procedure described in the publication by Seaton (Liu H., Zhang L., Seaton N. A., Chemical Engineering Science, 47, 17-18, pp. 4393-4404, 1992). This involves a Monte-Carlo simulation based on nitrogen adsorption/desorption isotherms. These connectivity parameters are based on percolation theory. Connectivity is associated with the numbers of adjacent pores and a high connectivity is an advantage for diffusion during the catalytic reactions of the molecules to be treated.

The alumina and the catalyst used in the process according to the invention also have a specific pore size distribution, in which the macropore and mesopore volumes are measured by mercury intrusion and the microporous volume is measured by nitrogen adsorption.

The term "macropores" means pores with an opening of more than 50 nm.

The term "mesopores" means pores with an opening of between 2 nm and 50 nm, inclusive.

The term "micropores" means pores with an opening of less than 2 nm.

In the following presentation of the invention, the pore size distribution measured by mercury porosimetry is determined by intrusion employing the mercury porosimeter according to standard ASTM D4284-83 at a maximum pressure of 4 000 bar (400 MPa), using a surface tension of 484 dyne/cm and a contact angle of 140°. The contact angle of 140° was used according to the recommendations of the publication "Techniques de l'ingénieur, traité analyse et caractérisation" (Engineering techniques, essay on analysis and characterisation), P 1050-5, by Jean Charpin and Bernard Rasneur.

The value from which the mercury fills all the intergranular voids is set at 0.2 MPa, and it is considered that above this the mercury penetrates the pores of the alumina.

To achieve greater accuracy, the value of the total pore volume corresponds to the value of the total pore volume measured by intrusion using the mercury porosimeter on the sample less the value of the total pore volume measured by intrusion using the mercury porosimeter on the same sample for a pressure corresponding to 30 psi (approximately 0.2 MPa).

The macropore volume of the catalyst is defined as the aggregate volume of mercury introduced at a pressure of between 0.2 MPa and 30 MPa, corresponding to the volume contained in the pores of apparent diameter of greater than 50 nm.

The mesopore volume of the catalyst is defined as the aggregate volume of mercury introduced at a pressure of between 30 MPa and 400 MPa, corresponding to the volume contained in the pores of apparent diameter of between 2 and 50 nm.

The volume of the micropores is measured by nitrogen porosimetry. The quantitative analysis of the microporosity is performed on the basis of the "t" method (Lippens-De Boer method, 1965) which corresponds to a transform of the starting adsorption isotherm as described in the publication "Adsorption by powders and porous solids. Principles, methodology and applications" by F. Rouquérol, J. Rouquérol and K. Sing, Academic Press, 1999.

The median diameter of the mesopores (Dp in nm) is also defined as being a diameter such that all the pores of a size less than this diameter account for 50% of the mesopore volume measured by mercury porosimetry.

The pore size distribution measured by nitrogen adsorption was determined using the Barrett-Joyner-Halenda (BJH) model. The nitrogen adsorption—desorption isotherm according to the BJH model is described in the periodical "The Journal of American Society", 73, 373, (1951) by E. P. Barrett, L. G. Joyner and P. P. Halenda. In the presentation of the invention that follows nitrogen adsorption volume means the volume measured for $P/P_0$=0.99, the pressure at which it is accepted that nitrogen has filled all the pores.

In the presentation of the invention that follows, specific surface area means the B.E.T. specific surface area determined by nitrogen adsorption according to standard ASTM D 3663-78 and established based on the BRUNAUER-EMMETT-TELLER method described in the periodical "The Journal of American Society", 60, 309, (1938).

In the following, the groups of chemical elements are given according to the CAS classification (CRC Handbook of Chemistry and Physics, published by CRC press, Editor-in-Chief D. R. Lide, 81$^{st}$ edition, 2 000-2001). For example, Group VIII according to the CAS classification corresponds to the metals of columns 8, 9 and 10 according to the new IUPAC classification.

DESCRIPTION OF THE INVENTION

The invention relates to a process for hydrotreatment of at least one hydrocarbon feedstock having a weighted average temperature (WAT) of more than 380° C.

Feedstocks

A wide variety of feedstocks can be treated by the hydrocracking processes according to the invention. The feedstock employed in the hydrocracking process according to the invention is a hydrocarbon feedstock having a weighted average temperature (WAT) of more than 380° C. The WAT is defined on the basis of the temperature at which 5%, 50% and 70% of the volume of the feedstock distill according to the formula: WAT=(T 5%+2×T 50%+4×T 70%)/7. The WAT is calculated on the basis of simulated distillation values. The WAT of the feedstock is more than 380° C. and by preference less than 600° C., and more preferably less than 580° C. The hydrocarbon feedstock treated generally has a distillation interval of between 250° C. and 600° C., by preference between 300 and 580° C.

In the text that follows, we will conventionally refer to this feedstock as vacuum distillate, but such a designation shall not be in any way restrictive. Any hydrocarbon feedstock containing sulphur and hydrotreatment-inhibiting nitrogen compounds and with a WAT similar to that of a vacuum distillate fraction may be the subject of the process that is the object of the invention. The hydrocarbon feedstock may be of any chemical kind, that is to say it may have any distribution among the various chemical families, particularly the paraffins, olefins, naphthenes and aromatics.

The feedstock treated in the process according to the invention is by preference a hydrocarbon feedstock with at least 50 wt. % of the components having an initial boiling point of higher than 340° C. and a final boiling point of lower than 540° C., by preference with at least 60 wt. %, preferably at least 75 wt. % and more preferably at least 80 wt. % of the components having an initial boiling point of higher than 340° C. and a final boiling point of less than 540° C.

Said hydrocarbon feedstock is advantageously selected from among vacuum distillates (or VD), effluents produced by a Fluid Catalytic Cracking (FCC) unit, Light Cycle Oil (LCO) produced by a catalytic cracking unit, Heavy Cycle Oil (HCO), paraffin effluents produced by Fischer-Tropsch synthesis, effluents produced by vacuum distillation, such as for example Vacuum Gas Oil (VGO) type fractions, effluents produced by coal liquefaction processes, feedstocks from biomass or effluents resulting from the conversion of feedstocks from biomass, and aromatic extracts and feedstocks from aromatic extraction units, alone or in a mixture.

By preference said hydrocarbon feedstock is a vacuum distillate fraction. The vacuum distillate fraction is generally produced by vacuum distillation of crude oil. Said vacuum distillate fraction includes aromatic compounds, naphthene compounds and/or paraffin compounds.

The vacuum distillate fraction may possibly contain heteroatoms selected from among nitrogen, sulphur and a mixture of these two elements. When nitrogen is present in said feedstock to be treated, the nitrogen content is greater than or equal to 300 ppm, by preference said content is between 300 and 10 000 ppm by weight, preferably between 500 and 10 000 ppm by weight, more preferably between 700 and 4 000 ppm by weight and more preferably still between 1 000 and 4 000 ppm. When sulphur is present in said feedstock to be treated, the sulphur content is between 0.01 and 5 wt. %, preferably between 0.2 and 4 wt. % and more preferably still between 0.5 and 3 wt. %.

Said vacuum distillate fraction may possibly also contain metals, in particular nickel and vanadium. The aggregate content of nickel and vanadium of said vacuum distillate fraction is by preference less than 1 ppm by weight. The asphaltenes content of said hydrocarbon feedstock is generally less than 3 000 ppm, preferably less than 1 000 ppm, more preferably still less than 200 ppm.

In a preferred embodiment, said hydrocarbon feedstock of the vacuum distillate (or VD) type can be used as is, that is to say on its own or in a mixture with other hydrocarbon fractions, preferably selected from among the effluents produced by a Fluid Catalytic Cracking (FCC) unit, Light Cycle Oil (LCO) produced by a catalytic cracking unit, Heavy Cycle Oil (HCO), atmospheric residues and residues under a vacuum from atmospheric and vacuum distillation of crude oil, paraffin effluents from Fischer-Tropsch synthesis, effluents from vacuum distillation, such as for example Vacuum Gas Oil (VGO) type fractions, Deasphalted Oil (DAO), effluents produced by coal liquefaction processes, feedstocks from biomass or effluents resulting from the conversion of feedstocks from biomass, and aromatic extracts and feedstocks from aromatic extraction units, alone or in a mixture.

In the preferred case where said hydrocarbon feedstock of the vacuum distillate (or VD) type is used on a mixture with other hydrocarbon fractions, said hydrocarbon fractions added alone or in a mixture, are present at a maximum of 50 wt. % of said mixture, by preference at a maximum of 40 wt. %, preferably at a maximum of 30 wt. % and more preferably at a maximum of 20 wt. % of said mixture.

According to the invention, the process for hydrotreatment of said hydrocarbon feedstock according to the invention is implemented at a temperature of between 250° C. and 430° C., preferably between 350° C. and 405° C. at a total pressure of between 4 MPa and 20 MPa and by preference between 6 MPa and 15 MPa with a ratio of volume of hydrogen to volume of hydrocarbon feedstock of between 200 and 2 000 liters per liter and preferably between 250 and 1 400 liters per liter and an Hourly Volume Velocity (HVV) defined by the ratio of the volume flow of liquid hydrocarbon feedstock to the volume of catalyst fed into the reactor of between 0.5 and 5 h$^{-1}$, and preferably between 0.7 and 3 h$^{-1}$.

According to a first embodiment, said hydrotreatment process according to the invention may advantageously be implemented upstream of a unit for hydrocracking said hydrocarbon feedstock.

In this case, said hydrotreatment process according to the invention advantageously operates at a temperature of between 350 and 430° C., by preference between 350 and 405° C. at a total pressure of between 8 MPa and 20 MPa and by preference between 9 MPa and 15 MPa with a ratio of volume of hydrogen to volume of hydrocarbon feedstock of between 200 and 2 000 liters per liter and by preference between 500 and 1200 liters per liter and at an Hourly Volume Velocity (HVV) defined by the ratio of the volume flow of liquid hydrocarbon feedstock to the volume of catalyst fed into the reactor of between 0.5 and 5 h$^{-1}$, and by preference between 1 and 3 h$^{-1}$.

According to a second embodiment, said hydrotreatment process according to the invention may advantageously be implemented upstream of a unit for fluidised bed catalytic cracking of said hydrocarbon feedstock.

In this case, said hydrotreatment process according to the invention advantageously operates at a temperature of between 250° C. and 420° C., preferably between 340° C. and 400° C. at a total pressure of between 4 MPa and 15 MPa and preferably between 4 MPa and 12 MPa with a ratio of volume of hydrogen to volume of hydrocarbon feedstock of between 200 and 2 000 liters per liter and by preference between 250 and 800 liters per liter and at an Hourly Volume Velocity (HVV) defined by the ratio of the volume flow of liquid hydrocarbon feedstock to the volume of catalyst fed into the reactor of between 0.5 and 5 h$^{-1}$, and preferably between 0.7 and 2 h$^{-1}$.

According to the invention, the catalyst used in said hydrotreatment process contains at least one metal from Group VIB and/or at least one metal from Group VIII of the periodic table and a support containing and by preference composed of an amorphous mesoporous alumina having a connectivity (Z) of more than 2.7.

By preference, the Group VIII elements are chosen from among the Group VIII noble and non-noble metals and by preference from among iron, cobalt, nickel, ruthenium, rhodium, palladium, osmium, iridium or platinum, alone or in a mixture and preferably from among cobalt and nickel, alone or in a mixture.

In the case of the Group VIII elements being selected from among the Group VIII non-noble metals, the Group VIII elements are advantageously chosen from among cobalt and nickel, alone or in a mixture. By preference, the Group VIB elements are chosen from among tungsten and molybdenum, alone or in a mixture. In the case of the hydrogenating function containing a Group VIII element and a Group VIB element, the following associations of metals are preferred: nickel-molybdenum, cobalt-molybdenum, iron-molybdenum, iron-tungsten, nickel-tungsten, cobalt-tungsten, and in a highly preferred manner: nickel-molybdenum, cobalt-molybdenum and nickel-tungsten. It is also possible to use associations of three metals such as for example nickel-cobalt-molybdenum. Where a combination of Group VI and Group VIII metals is used, the catalyst is then preferentially used in a sulphurated form.

According to a preferred mode, said catalyst may also contain tin, the tin content being by preference between 0.1 and 0.5 wt. % in relation to the total mass of catalyst.

In the case where the catalyst contains at least one Group VIB metal in combination with at least one Group VIII non-noble metal, the content of Group VIB metal is advantageously between 5 and 45 wt. % of oxide in relation to the total mass of said catalyst, preferably between 10 and 40 wt. % of oxide and in a highly preferred manner between 20 and 35 wt. % of oxide and the content of Group VIII non-noble metal is advantageously between 0.5 and 10 wt. % of oxide in relation to the total mass of said catalyst, by preference between 1 and 8 wt. % of oxide and in a highly preferred manner between 1.5 and 6 wt. % of oxide.

Advantageously, the catalyst used in the process according to the invention can contain at least one doping element selected from among phosphorous, boron, fluorine or silicon, alone or in a mixture. By preference the doping agent is phosphorous.

Where the catalyst contains phosphorous, the phosphorous content in said catalyst is by preference between 0.5 and 15 wt. % of $P_2O_5$, more preferably between 1 and 10 wt. % of $P_2O_5$, and in a highly preferred manner between 2 and 8 wt. % of $P_2O_5$.

According to the first embodiment in which said hydrotreatment process according to the invention is advantageously implemented upstream of a unit for hydrocracking of said hydrocarbon feedstock, the catalyst used in said hydrotreatment process includes by preference nickel and molybdenum.

According to the second embodiment in which said hydrotreatment process according to the invention is advantageously implemented upstream of a unit for fluidised bed catalytic cracking of said hydrocarbon feedstock, the catalyst used in said hydrotreatment process includes by preference nickel and molybdenum, cobalt and molybdenum, or nickel, cobalt and molybdenum.

By preference, the catalyst used in the process according to the invention includes a support containing and by preference composed of an amorphous mesoporous alumina, said alumina being prepared according to the invention.

By preference, the support for the catalyst used in the invention contains and is by preference composed of an amorphous mesoporous alumina having a connectivity (Z) of between 2.7 and 10, by preference between 2.8 and 10, in a highly preferred manner between 3 and 9, more preferably between 3 and 8 and more preferably still between 3 and 7, the connectivity being determined on the basis of the nitrogen adsorption/desorption isotherms.

Said alumina used as a support in the catalyst and the support containing said alumina have a specific surface area and a pore size distribution calibrated and adapted to their use in a process for hydrotreatment of said hydrocarbon feedstock.

Said amorphous mesoporous alumina constituting the support for the catalyst and the support for the catalyst used in the process according to the invention advantageously have the following pore size distribution, measured by mercury porosimetry:
  the percentage volume included in the pores of a size between 2 and 8 nm in relation to the total pore volume, is between 20 and 40%,
  the percentage volume included in the pores of a size between 8 and 20 nm in relation to the total pore volume, is between 50 and 65%,
  the percentage volume included in the pores of a size between 20 and 50 nm in relation to the total pore volume, is less than 10%,
  the percentage volume included in the pores of a size between 50 and 7 000 nm in relation to the total pore volume, is less than 10%, and by preference less than 6%.

By preference, the mesoporous alumina has no micropores.

By preference, the mesoporous support containing said alumina has no micropores.

By preference, the alumina used in the invention and said support containing said alumina do not have a mesostructure.

By preference, said alumina and said support have a specific surface area BET of between 50 and 450 m$^2$/g, by preference between 100 and 400 m²/g, preferably between 150 and 400 m²/g and in a highly preferred manner between 150 and 350 m²/g.

By preference, the total pore volume of said alumina and of said support measured by mercury porosimetry is between 0.6 and 0.9 ml/g.

By preference, said alumina and said support have a mesopore volume of between 0.6 and 0.8 ml/g and by preference between 0.65 and 0.8 ml/g.

By preference, the support and the alumina have a macropore volume of between 0 and 0.1, by preference between 0.01 and 0.1 ml/g and in a preferred manner between 0.01 and 0.05 ml/g.

The median diameter of the mesopores (Dp in nm) measured by mercury porosimetry of said alumina and of said support, determined by volume is advantageously between 8 and 12.5 nm and preferably between 9.0 and 12.5 nm.

The catalyst used in the invention also has a connectivity (Z) advantageously of more than 2.7 and by preference between 2.7 and 10, in a preferred manner between 2.8 and 10, in a highly preferred manner between 3 and 9, more preferably between 3 and 8 and more preferably still between 3 and 7, the connectivity of the catalyst being determined on the basis of the nitrogen adsorption/desorption isotherms.

Said catalyst advantageously has a specific surface area BET of between 50 and 450 m²/g, by preference between 50 and 300 m²/g, preferably between 100 and 300 m²/g and in a highly preferred manner between 100 and 250 m²/g.

By preference, said catalyst has a mesopore volume of between 0.1 and 0.6 ml/g and preferably between 0.2 and 0.5 ml/g.

By preference, said catalyst has a macropore volume of between 0.01 and 0.1 ml/g.

Said catalyst is also advantageously characterised by the following pore size distribution measured by mercury porosimetry:
the percentage volume included in the pores of a size of less than 8 nm in relation to the total pore volume, is between 20 and 40%,
the percentage volume included in the pores of a size between 8 and 20 nm in relation to the total pore volume, is between 40 and 65%,
the percentage volume included in the pores of a size between 20 and 50 nm in relation to the total pore volume, is less than 10%,
the percentage volume included in the pores of a size between 50 and 7 000 nm in relation to the total pore volume, is less than 10%, and by preference less than 5%.

Said alumina used as a support for the catalyst used in the process according to the invention is advantageously prepared according to the process of preparation comprising at least the following steps:
a) at least one first step a) of alumina precipitation, in aqueous reaction medium, of at least one basic precursor selected from among sodium aluminate, potassium aluminate, ammonia, sodium hydroxide and potassium hydroxide and at least one acid precursor selected from among aluminium sulphate, aluminium chloride, aluminium nitrate, sulphuric acid, hydrochloric acid, and nitric acid, in which at least one of the basic or acid precursors contains aluminium, the relative flow of the acid and basic precursors is selected in order to obtain a pH of the reaction medium of between 8.5 and 10.5 and the flow of the acid and basic precursor(s) containing aluminium is adjusted in order to obtain a rate of progress of said first step of between 40 and 100%, the rate of progress being defined as being proportion of alumina formed as equivalent $Al_2O_3$ during said first precipitation step in relation to the total quantity of alumina formed in the precipitation step(s), said first precipitation step operating at a temperature of between 10 and 50° C., and for a period of between 2 minutes and 30 minutes,
b) a step for thermal treatment of the suspension obtained in step a) at a temperature of between 50 and 200° C. for a period of between 30 minutes and 5 hours allowing an alumina gel to be obtained,
c) a step for filtration of the suspension obtained from thermal treatment step b), followed by at least one washing step of the gel obtained,
d) a step for drying the alumina gel obtained in step c) for obtaining a powder,
e) a step for shaping the powder obtained in step d) for obtaining the raw material,
f) a step for thermal treatment of the raw material obtained in step e) at a temperature of between 500 and 1 000° C., in the presence or not of the air flow containing up to 60 vol. % of water.

"Rate of progress" of the $n^{th}$ step of precipitation is generally understood to be the percentage of alumina formed as equivalent $Al_2O_3$ in said $n^{th}$ step, in relation to the total quantity of alumina formed in all precipitation steps and more generally in the alumina gel preparation steps.

In the case of the rate of progress of said precipitation step a) being 100%, said precipitation step a) generally allows an alumina suspension to be obtained having a concentration of $Al_2O_3$ of between 20 and 100 g/l, by preference between 20 and 80 g/l, preferably between 20 and 50 g/l.

Precipitation Step a)

The mixture in the aqueous reaction medium of at least one basic precursor and at least one acid precursor requires either that at least the basic precursor or the acid precursor contains aluminium, or that both the basic and acid precursors contain aluminium.

The basic precursors containing aluminium are sodium aluminate and potassium aluminate.

The preferred basic precursor is sodium aluminate.

The acid precursors containing aluminium are aluminium sulphate, aluminium chloride and aluminium nitrate. The preferred acid precursor is aluminium sulphate.

By preference, basic and acid precursor(s) are added in said first precipitation step a) in aqueous solution containing said precursor(s).

By preference, the aqueous reaction medium is water.

By preference, said step a) is performed under agitation.

By preference, said step a) is carried out in the absence of organic additive.

The acid and basic precursors, whether or not containing aluminium, are mixed, by preference in solution, in the aqueous reaction medium, in proportions such that the pH of the resulting suspension is between 8.5 and 10.5.

According to the invention it is the relative flow of the acid and basic precursors whether or not they contain aluminium, which is selected in order to obtain a pH of the reaction medium of between 8.5 and 10.5.

In the preferred case in which the basic and acid precursors are respectively sodium aluminate and aluminium sulphate, the mass ratio of said basic precursor to said acid precursor is advantageously between 1.6 and 2.05.

For the other basic and acid precursors, whether or not they contain aluminium, the base/acid mass ratios are established by a curve of the neutralisation of the base by the acid. Such a curve can be easily obtained by a person skilled in the art.

By preference, said precipitation step a) is performed at a pH of between 8.5 and 10 and in a highly preferred manner between 8.7 and 9.9.

The acid and basic precursors are also mixed in quantities allowing a suspension to be obtained containing the desired quantity of alumina, as a function of the final concentration of alumina to be achieved. In particular, said step a) allows 40 to 100 wt. % of alumina as equivalent $Al_2O_3$ in relation to the total quantity of alumina formed in the precipitation step(s) and more generally in the alumina gel preparation steps, to be obtained.

According to the invention it is the flow of the acid and basic precursor(s) containing aluminium which is adjusted in order to obtain a rate of progress of the first step of between 40 and 100%.

By preference, the rate of progress of said precipitation step a) is between 40 and 99%, by preference between 45 and 90% and preferably between 50 and 85%. In the case of the rate of progress obtained from precipitation step a) being less than 100%, a second precipitation step is necessary in order to increase the quantity of alumina formed. In this case, the rate of progress is defined as being the alumina formed as equivalent $Al_2O_3$ in said precipitation step a) as a proportion of the total quantity of alumina formed in the two precipitation steps of the preparation process according to the invention and more generally in the alumina gel preparation steps.

So, as a function of the concentration of alumina in question from the precipitation step(s), by preference between 20 and 100 g/l, the quantities of aluminium to be provided by the acid and/or basic precursors are calculated and the flow of the precursors is adjusted as a function of the concentration of aluminium in said added precursors, the quantity of water added in the reaction medium and the rate of progress required for the precipitation step(s).

The flows of the acid and/or basic precursor(s) containing aluminium depend on the size of the reactor used and thus on the amount of water added to the reaction medium.

By preference, said precipitation step a) is carried out at a temperature of between 10 and 45° C., by preference between 15 and 45° C., more preferably between 20 and 45° C. and in a highly preferred manner between 20 and 40° C.

It is important that said precipitation step a) operates at low temperature. In the case of said preparation process according to the invention comprising two precipitation steps, precipitation step a) is advantageously carried out at a temperature below the temperature of the second precipitation step.

By preference, said precipitation step a) is carried out for a period of between 5 and 20 minutes, and by preference between 5 and 15 minutes.

Thermal Treatment Step b)

According to the invention said preparation process includes a step b) for thermal treatment of the suspension obtained from precipitation step a), said thermal treatment step operating at a temperature of between 60 and 200° C. for a period of between 30 minutes and 5 hours, to obtain the alumina gel.

By preference, said thermal treatment step b) is a maturing step.

By preference, said thermal treatment step b) operates at a temperature of between 65 and 150° C., by preference between 65 and 130° C., preferably between 70 and 110° C., and in a highly preferred manner between 70 and 95° C.

By preference, said thermal treatment step b) is implemented for a period of between 40 minutes and 5 hours, by preference between 40 minutes and 3 hours and preferably between 45 minutes and 2 hours.

Optional Second Precipitation Step

According to a preferred embodiment, in the case of the rate of progress obtained from precipitation step a) being less than 100%, said preparation process includes by preference a second precipitation step a') after the first precipitation step.

Said second precipitation step allows an increase in the proportion of alumina produced.

Said second precipitation step a') is advantageously implemented between said first precipitation step a) and thermal treatment step b).

In the case of a second precipitation step being implemented, a step for heating of the suspension obtained from precipitation step a) is advantageously implemented between the two precipitation steps a) and a').

By preference, said step for heating of the suspension obtained in step a), implemented between said step a) and the second precipitation step a') operates at a temperature of between 20 and 90° C., by preference between 30 and 80° C., preferably between 30 and 70° C. and in a highly preferred manner between 40 and 65° C.

By preference, said heating step is implemented for a period of between 7 and 45 minutes and preferably between 7 and 35 minutes.

Said heating step is advantageously implemented according to all the heating methods known to a person skilled in the art.

According to said preferred embodiment, said preparation process includes a second step for precipitation of the suspension obtained from the heating step, said second step operating by addition to said suspension of at least one basic precursor selected from among sodium aluminate, potassium aluminate, ammonia, sodium hydroxide and potassium hydroxide and at least one acid precursor selected from among aluminium sulphate, aluminium chloride, aluminium nitrate, sulphuric acid, hydrochloric acid, and nitric acid, in which at least one of the basic or acid precursors contains aluminium, the relative flow of the acid and basic precursors is selected in order to obtain a pH of the reaction medium of between 8.5 and 10.5 and the flow of the acid and basic precursor(s) containing aluminium is adjusted in order to obtain a rate of progress of the second step of between 0 and 60%, the rate of progress being defined as being the proportion of alumina formed as equivalent $Al_2O_3$ during said second precipitation step with respect to the total quantity of alumina formed in the two precipitation steps, more generally in the steps for preparation of the alumina gel and by preference in step a') of the preparation process according to the invention, said step operating at a temperature of between 40 and 90° C., and for a period of between 2 minutes and 50 minutes.

Just as in the first precipitation step a), the addition to the heated suspension of at least one basic precursor and at least one acid precursor requires either that at least the basic precursor or the acid precursor contains aluminium or that both the basic and acid precursors contain aluminium.

The basic precursors containing aluminium are sodium aluminate and potassium aluminate.

The preferred basic precursor is sodium aluminate.

The acid precursors containing aluminium are aluminium sulphate, aluminium chloride and aluminium nitrate. The preferred acid precursor is aluminium sulphate.

By preference, said second precipitation step operates under agitation.

By preference, said second step is carried out in the absence of organic additive.

The acid and basic precursors, whether or not they contain aluminium, are mixed, by preference in solution, in the aqueous reaction medium, in proportions such that the pH of the resulting suspension is between 8.5 and 10.5.

Just as in precipitation step a), it is the relative flow of the acid and basic precursors, whether or not they contain aluminium, which is selected in order to obtain a pH of the reaction medium of between 8.5 and 10.5.

In the preferred case of the basic and acid precursors being respectively sodium aluminate and aluminium sulphate, the mass ratio of said basic precursor to said acid precursor is advantageously between 1.6 and 2.05.

For the other basic and acid precursors, whether or not they contain aluminium, base/acid mass ratios are established by a curve of the neutralisation of the base by the acid. Such a curve can be easily obtained by a person skilled in the art.

By preference, said second precipitation step is carried out at a pH of between 8.5 and 10 and by preference between 8.7 and 9.9.

The acid and basic precursors are also mixed in quantities allowing a suspension to be obtained containing the desired quantity of alumina, as a function of the final concentration of alumina to be achieved. In particular, said second precipitation step allows 0 to 60 wt. % of alumina as equivalent $Al_2O_3$ in relation to the total quantity of alumina formed in the two precipitation step(s).

Just as in precipitation step a), it is the flow of the acid and basic precursor(s) containing aluminium which is adjusted in order to obtain a rate of progress of the first step of between 0 and 60%.

By preference, the rate of progress of said precipitation step a) is between 10 and 55% and by preference between 15 and 55%.

So, as a function of the concentration of alumina in question from the precipitation step(s), by preference between 20 and 100 g/l, the quantities of aluminium to be provided by the acid and/or basic precursors are calculated and the flow of the precursors is adjusted as a function of the concentration of aluminium in said added precursors, the quantity of water added in the reaction medium and the rate of progress required for the precipitation step(s).

Just as in precipitation step a), the flows of the acid and/or basic precursor(s) containing aluminium depend on the size of the reactor used and thus on the amount of water added to the reaction medium.

By way of example, if working with a 3 l reactor and aiming for 1 l of alumina suspension with a final concentration of $Al_2O_3$ of 50 g/l, the target rate of progress is 50% as equivalent $Al_2O_3$ for the first precipitation step. So, 50% of the total alumina must be provided in precipitation step a). The alumina precursors are sodium aluminate at a concentration of $Al_2O_3$ of 155 g/l and aluminium sulphate at a concentration of $Al_2O_3$ of 102 g/l. The precipitation pH of the first step is set at 9.5 and of the second at 9. The quantity of water added in the reactor is 622 ml.

For the first precipitation step a) operating at 30° C. and for 8 minutes, the flow of aluminium sulphate must be 10.5 ml/min and the flow of sodium aluminate is 13.2 ml/min. The mass ratio of sodium aluminate to aluminium sulphate is thus 1.91.

For the second precipitation step, operating at 70° C., for 30 minutes, the flow of aluminium sulphate must be 2.9 ml/min and the flow of sodium aluminate is 3.5 ml/min. The mass ratio of sodium aluminate to aluminium sulphate is thus 1.84.

By preference, the second precipitation step is carried out at a temperature of between 40 and 80° C., preferably between 45 and 70° C. and in a highly preferred manner between 50 and 70° C.

By preference, the second precipitation step is carried out for a period of between 5 and 45 minutes, and preferably between 7 and 40 minutes.

The second precipitation step generally allows a suspension of alumina to be obtained having a concentration of $Al_2O_3$ of between 20 and 100 g/l, by preference between 20 and 80 g/l, preferably between 20 and 50 g/l.

In the case of said second precipitation step being implemented, said preparation process also advantageously includes a second step for heating of the suspension obtained in the said second precipitation step at a temperature of between 50 and 95° C. and by preference between 60 and 90° C.

By preference, said second heating step is implemented for a period of between 7 and 45 minutes.

Said second heating step is advantageously implemented according to all the heating methods known to a person skilled in the art.

Said second heating step allows an increase in the temperature of the reaction medium before subjecting the suspension obtained in step b) to thermal treatment.

Filtration Step c)

According to the invention, the alumina preparation process according to the invention also contains a step c) for filtration of the suspension obtained from thermal treatment step b), followed by at least one step for washing of the gel obtained. Said filtration step is carried out according to the methods known to a person skilled in the art.

The filterability of the suspension obtained from precipitation step a) or the two precipitation steps is improved by the presence of said final step b) for thermal treatment of the suspension obtained, said thermal treatment step being beneficial to the productivity of the preparation process and an extension of the process to the industrial level.

Said filtration step is advantageously followed by at least one washing step by water and by preference one to three washing steps with a quantity of water equal to the quantity of filtered precipitate.

The series of steps a) b) and c) and possibly the second precipitation step, the second heating step and the optional filtration step, allow a specific alumina gel to be obtained having a dispersibility index of greater than 70%, a size of crystallite of between 1 and 35 nm, and a sulphur content of between 0.001% and 2 wt. % and a sodium content of between 0.001% and 2 wt. %, the percentages by weight being expressed in relation to the total mass of alumina gel.

The alumina gel obtained in this way, also referred to as boehmite, has a dispersibility index of between 70 and 100%, preferably between 80 and 100%, in a highly preferred manner entre 85 and 100% and more preferably still between 90 and 100%.

By preference, the alumina gel obtained in this way has a size of crystallites of between 2 and 35 nm.

By preference, the alumina gel obtained in this way has a sulphur content of between 0.001% and 1 wt. %, preferably between 0.001 and 0.40 wt. %, in a highly preferred manner between 0.003 and 0.33 wt. %, and more preferably between 0.005 and 0.25 wt. %.

By preference, the alumina gel obtained in this way has a sodium content of between 0.001% and 1 wt. %, preferably between 0.001 and 0.15 wt. %, in a highly preferred manner between 0.0015 and 0.10 wt. %, and 0.002 and 0.040 wt. %.

In particular, the alumina gel or the boehmite in powder form according to the invention is made up of crystallites having a size, obtained by the Scherrer formula using X-ray diffraction according to the crystallographic directions (020) and (120), of between 2 and 20 nm and between 2 and 35 nm, respectively.

By preference, the alumina gel according to the invention has a size of crystallites according to the crystallographic direction (020) of between 1 and 15 nm and a size of crystallite according to the crystallographic direction (120) of between 1 and 35 nm.

The X-ray diffraction of the alumina gels or boehmites was carried out according to the conventional powder method using a diffractometer.

The Scherrer formula is a formula used in X-ray diffraction of powders or polycrystalline specimens which provides a link between the width at mid-height of the diffraction peaks and the size of the crystallites. It is described in detail in the reference work: Appl. Cryst. (1978). 11, 102-113 Scherrer after sixty years: A survey and some new results in the determination of crystallite size, J. I. Langford and A. J. C. Wilson.

The alumina gel prepared in this way and having a high dispersibility rate allows simplification of the shaping step of said gel according to all the methods known to a person skilled in the art and in particular by kneading extrusion, by granulation and by the technique known as oil drop.

Drying Step d)

According to the invention, the alumina gel obtained in filtration step c), is dried in a drying step d) to obtain a powder.

Said drying step is advantageously implemented at a temperature of between 20 and 50° C. and for a period of between 1 day and 3 weeks or by spray-drying.

In the case of said drying step d) being implemented at a temperature of between 20 and 50° C. and for a period of between 1 day and 3 weeks, said drying step d) can advantageously be carried out in a closed and ventilated oven, by preference said drying step operating at a temperature of between 25 and 40° C., and for a period of between 3 days and two weeks.

In the case of said drying step d) being implemented by spray-drying, the cake obtained in the thermal treatment step possibly followed by a filtration step is placed in suspension again. Said suspension is then sprayed in fine droplets, in a vertical cylindrical enclosure in contact with a current of hot air in order to evaporate the water according the principle well known to a person skilled in the art. The powder obtained is carried by the flow of heat as far as a cyclone or a bag filter for separation of the air from the powder. By preference, in the case of said drying step d) being implemented by spray-drying, the spray-drying is carried out according to the operating procedure described in the publication Asep Bayu Dani Nandiyanto, Kikuo Okuyama, Advanced Powder Technology, 22, 1-19, 2011.

Shaping Step e)

According to the invention, the powder obtained in drying step d) is shaped in a step e) to obtain a raw material.

Raw material means the shaped material that has not undergone thermal treatment steps.

By preference, said shaping step e) is carried out by kneading extrusion, by pelleting, by the oil-drop method, by turntable granulation or by any other method well-known to a person skilled in the art.

In a highly preferred manner, said shaping step e) is carried out by kneading extrusion.

Thermal Treatment Step f)

According to the invention, the raw material obtained in shaping step e) then undergoes a thermal treatment step f) at a temperature of between 500 and 1 000° C., for a period of between 2 and 10 h, in the presence or not of an air flow containing up to 60 vol. % of water.

By preference, said thermal treatment step f) operates at a temperature of between 540° C. and 850° C.

By preference, said step thermal treatment step f) operates for a period of between 2 h and 10 h Said thermal treatment step f) allows the conversion of the boehmite to the final alumina.

The process for preparation of the alumina used as a support for the catalyst employed in the process according to the invention allows an amorphous mesoporous alumina to be obtained having a connectivity of more than 2.7 and a controlled mesoporosity, said alumina having good thermal and chemical stability, a distribution of the size of the mesopores that is centred, uniform and controlled, and specific surface area and calibrated pore and mesopore volumes.

The catalyst used in the hydrotreatment process according to the invention is then advantageously obtained by addition of the elements making up the active phase.

The Group VIB and/or Group VIII elements and possibly at least one doping element selected from among boron, silicon, fluorine and phosphorous and possibly the Group IVB or Group IB elements in the case of the active phase having a reduced nickel content, and possibly at least one organic additive can possibly be introduced, in full or in part, at any preparation step, during synthesis of the support, by preference during shaping of the support, or in a highly preferred manner after shaping of the support by any method known to a person skilled in the art. They may be introduced after the shaping of the support and after or before drying and calcination of the support and by preference after the step for calcination of the shaped support.

According to a preferred mode of the invention, all or some of the Group VIB and/or the Group VIII elements, and possibly at least one doping element selected from among boron, silicon and phosphorous and possibly the Group IVB or Group IB elements in the case of the active phase having a reduced nickel content, and possibly at least one organic additive, can be introduced during the shaping of the support, for example during the step of kneading extrusion of the dried powder obtained.

According to another preferred mode of the invention, all or part of the Group VIB and/or Group VIII elements and possibly at least one doping element selected from among boron, silicon and phosphorous and possibly the Group IVB or Group IB elements in the case of the active phase having a reduced nickel content, and possibly at least one organic additive, can be introduced by one or more operations for impregnation of the shaped and calcined support, by a solution containing the precursors of said elements. In a preferred manner, the support is impregnated by an aqueous solution. The impregnation of the support is by preference carried out using the method referred to as dry impregnation and well known to a person skilled in the art in which the exact quantity of desired elements is introduced in the form of soluble salts into the solvent selected, for example demineralised water, in order to fill as accurately as possible the pores of the support.

In the case of the catalyst used in the hydrotreatment process according to the invention containing a Group VIII non-noble metal, the Group VIII metals are by preference introduced by one or more operations for impregnation of the shaped and calcined support, after those from Group VIB or at the same time as these.

According to another preferred mode of the invention, the deposition of the Group IVB or Group IB elements can also be carried out simultaneously using for example a solution containing a tin salt or copper salt.

According to another preferred mode of the invention, the deposition of boron and of silicon can also be carried out simultaneously using for example a solution containing a boron salt and a silicon compound of the silicone type.

When at least one doping element, P and/or B and/or Si, is introduced, its distribution and its location can be determined by techniques such as the Castaing microprobe (distribution of the various elements), electronic transmission microscopy coupled with EDX analysis (energy dispersive X-ray spectroscopy) of the components of the catalyst, or also by establishing mapping of the distribution of the elements present in the catalyst by electronic microprobe.

For example, among the sources of molybdenum and tungsten, it is possible to use oxides and hydroxides, molybdic and tungstic acids and their salts and in particular ammonium salts such as ammonium molybdate, ammonium heptamolybdate, ammonium tungstate, phosphomolybdic acid, phosphotungstic acid and their salts, silicomolybdic acid, silicotungstic acid and their salts. By preference use is made of ammonium salts such as ammonium molybdate, ammonium heptamolybdate and ammonium tungstate.

The sources of Group VIII non-noble elements that can be used are well known to a person skilled in the art. For example, for the non-noble metals use will be made of nitrates, sulphates, hydroxides, phosphates, halides such as for example chlorides, bromides and fluorides, carboxylates such as for example acetates and carbonates.

The promoter element(s) selected from the group containing silicon, boron and phosphorous can advantageously be introduced by one or more impregnation operations with an excess of solution on the calcined precursor.

The source of boron can advantageously be boric acid, by preference orthoboric acid $H_3BO_3$, ammonium biborate or pentaborate, boron oxide, or boric esters. The boron can for example be introduced in the form of a mixture of boric acid, oxygenated water and a basic organic compound containing nitrogen such as ammonia, primary and secondary amines, cyclic amines, compounds from the pyridine and quinolines family and compounds from the pyrrole family. Boron can be introduced for example by a solution of boric acid in a mixture of water/alcohol.

The preferred source of phosphorous is orthophosphoric acid $H_3PO_4$, but its salts and esters such as ammonium phosphates are equally suitable. Phosphorous can for example be introduced in the form of a mixture of phosphoric acid and a basic organic compound containing nitrogen such as ammonia, primary and secondary amines, cyclic amines, compounds from the pyridine and quinolines family and compounds from the pyrrole family. Numerous sources of silicon can advantageously be employed. So, it is possible to use ethyl orthosilicate $Si(OEt)_4$, siloxanes, polysiloxanes, silicones, silicone emulsions, halide silicates such as ammonium fluorosilicate $(NH_4)_2SiF_6$ or sodium fluorosilicate $Na_2SiF_6$. Silicomolybdic acid and its salts, and silicotungstic acid and its salts can also be advantageously employed. Silicon can be advantageously added for example by impregnation of ethyl silicate in solution in a mixture of water/alcohol. The silicon can be added for example by impregnation of a silicon compound of the silicone type of silicic acid in suspension in water.

The sources of Group IB element that can be used are well known to a person skilled in the art. For example, one of the possible sources of copper that can be used is copper nitrate $Cu(NO_3)_2$.

The sources of Group IVB elements that can be used are well known to a person skilled in the art. For example, one of the sources of tin that can be used is tin chloride $SnCl_2$.

The catalyst used in the hydrotreatment process according to the invention can advantageously be an additive. In this case, at least one organic additive is added as defined above and by preference introduced into the impregnation solution containing the precursors of the active phase or in a later impregnation step.

The invention is illustrated by the following examples which shall not be in any way restrictive.

EXAMPLES

Example 1

(Comparative) Preparation of a Support AL-1 (Non-Conforming) According to U.S. Pat. No. 7,790,562

To begin with a synthesis was performed of an alumina gel which did not conform in that Example 2 was carried out according to the preparation process described in U.S. Pat. No. 7,790,562. In particular, the process for preparation of the alumina gel according to example 2 did not include the step for thermal treatment of the suspension obtained in the precipitation steps and the first precipitation step a) did not produce a quantity of alumina of more than 40% as equivalent $Al_2O_3$ in relation to the total quantity of alumina formed in the second precipitation step.

The synthesis was carried out in a 7 l reactor with a final suspension of 5 l in 2 precipitation steps. The quantity of water added in the reactor was 3 868 ml.

The final concentration of alumina in question was 30 g/l.

A first step of co-precipitation of aluminium sulphate $Al_2(SO_4)$ and sodium aluminate NaAlOO was carried out at 30° C. and pH=9.3 for a period of 8 minutes. The concentrations of the aluminium precursors used were as follows: $Al_2(SO_4)$=at 102 g/l of $Al_2O_3$ and NaAlOO at 155 g/l of $Al_2O_3$. Agitation was performed at 350 rpm throughout the synthesis.

A solution of aluminium sulphate $Al_2(SO_4)$ was added continuously for 8 minutes at a flow of 19.6 ml/min to a solution of sodium aluminate NaAlOO according to a base/acid mass ratio=1.80 in order to adjust the pH to a value of 9.3. The temperature of the reaction medium was maintained at 30° C.

A suspension containing an alumina precipitate was obtained.

The final concentration of alumina in question was 30 g/l, and the flow of the aluminium sulphate $Al_2(SO_4)$ and sodium aluminate NaAlOO precursors containing aluminium introduced in the first precipitation steps were 19.6 ml/min and 23.3 ml/min respectively. These flows of acid and basic precursors containing aluminium allowed a rate of progress of 30% to be achieved in the first precipitation step.

The suspension obtained then underwent an increase in temperature from 30 to 57° C.

A second step of co-precipitation of the suspension obtained was then carried out by addition of aluminium sulphate $Al_2(SO_4)$ at a concentration of 102 g/l of $Al_2O_3$ and of sodium aluminate NaAlOO at a concentration of 155 g/l of $Al_2O_3$. A solution of aluminium sulphate $Al_2(SO_4)$ was thus added continuously to the heated suspension obtained in the first precipitation step for 30 minutes at a flow of 12.8 ml/min to a solution of sodium aluminate NaAlOO according to a base/acid mass ratio=1.68 in order to adjust the pH to a value of 8.7. The temperature of the reaction medium in the second step was maintained at 57° C. A suspension containing an alumina precipitate was obtained.

The final concentration of alumina in question was 30 g/l, and the flow of the aluminium sulphate $Al_2(SO_4)$ and sodium aluminate NaAlOO precursors containing aluminium introduced in the second precipitation step were 12.8 ml/min and 14.1 ml/min, respectively. These flows of acid and basic precursors containing aluminium allowed a rate of progress of 70% to be achieved in the second precipitation step.

The suspension obtained in this way did not undergo a thermal treatment step or maturation.

The suspension obtained was then filtered by water displacement on a fritted Buchner type device and the alumina gel obtained was washed 3 times with 5 l of distilled water at 70° C.

The length of filtration and the washes was 4 hours.

The characteristics of the alumina gel obtained in this way are summarised in Table 1.

TABLE 1

Characteristics of the alumina gel obtained according to Example 1.

| | Alumina gel according to Example 1 |
|---|---|
| Dispersibility index Ta = 10% (%) | 60 |
| Size (020) (nm) | 2.9 |
| Size (120) (nm) | 4.1 |
| Sodium Na (ppm) | 0.011 |
| Sulphur S (ppm) | 0.057 |
| Filtration time | 4 hours |

The alumina gel was then dried by spray-drying with an inlet temperature of 250° C. and an outlet temperature of 130° C.

The dried alumina gel was introduced into a Brabender type kneader. Water acidified with nitric acid having a total acid content of 3%, by weight in relation to the mass of the dried gel introduced into the kneader, was added in 5 minutes, during kneading at 20 revolutions/min. The acid kneading was continued for 15 minutes. A neutralisation step was then carried out by addition of an ammonium solution in the kneader, having a neutralisation content of 50%, by weight of ammonia in relation to the quantity of nitric acid introduced into the kneader for the acidification step. The kneading was continued for 3 minutes.

The paste obtained was then extruded through a three-lobed 2 mm nozzle. The extrudates obtained were dried at 100° C. overnight and then calcined for 2 hours at 600° C.

The characteristics of the alumina formed are given in Table 2:

TABLE 2 characteristics of the alumina AL-1 obtained according to example 1.

| | AL-1 |
|---|---|
| $S_{BET}$ (m²/g) | 230 |
| $V_{Des°N2}$ (ml/g) | 0.91 |
| VPT (Hg) (ml/g) | 0.78 |
| Vmacro (Hg) (ml/g) | 0.01 |
| Vmeso (Hg) (ml/g) | 0.81 |
| V (d<6 nm) % | 43 |
| V (6 < d < 15 nm) % | 55 |
| V (15 < d < 50 nm) % | 1 |
| Z | 2.5 |
| Dp (Hg) (nm) | 1., 9 |

Example 2 (According to the Invention)

Preparation of Supports AL-2 and AL-3 (Conforming)

To begin with a synthesis was performed of two alumina supports AL-2 and AL-3 according to a preparation conforming to the invention in a 7 l reactor and with a final suspension of 5 l in 3 steps, two precipitation steps followed by a maturation step.

The final concentration of alumina in question was 45 g/l. The quantity of water added to the reactor was 3 267 ml. Agitation was performed at 350 rpm throughout the synthesis.

A first step of co-precipitation in water, of aluminium sulphate $Al_2(SO_4)$ and sodium aluminate NaAlOO was carried out at 30° C. and pH=9.5 for a period of 8 minutes. The concentrations of the aluminium precursors used were as follows: $Al_2(SO_4)$=at 102 g/l of $Al_2O_3$ and NaAlOO at 155 g/l of $Al_2O_3$ A solution of aluminium sulphate $Al_2(SO_4)$ was thus added continuously for 8 minutes at a flow of 69.6 ml/min to a solution of sodium aluminate NaAlOO at a flow of 84.5 ml/min according to a base/acid mass ratio=1.84 in order to adjust the pH to a value of 9.5. The temperature of the reaction medium was maintained at 30° C.

A suspension containing an alumina precipitate was obtained.

The final concentration of alumina in question was 45 g/l, and the flow of the aluminium sulphate $Al_2(SO_4)$ and sodium aluminate NaAlOO precursors containing aluminium introduced into the first precipitation steps were 69.6 ml/min and 84.5 ml/min respectively. These flows of acid and basic precursors containing aluminium allowed a rates of progress of 72% to be achieved in the first precipitation step.

The suspension obtained then underwent an increase in temperature from 30 to 68° C.

A second step of co-precipitation of the suspension obtained was then carried out by addition of aluminium sulphate $Al_2(SO_4)$ at a concentration of 102 g/l of $Al_2O_3$ and sodium aluminate NaAlOO at a concentration of 155 g/l of $Al_2O_3$. A solution of aluminium sulphate $Al_2(SO_4)$ was thus continuously added to the heated suspension obtained in the first precipitation step for 30 minutes at a flow of 7.2 ml/min to a solution of sodium aluminate NaAlOO according to a base/mass ratio=1.86 in order to adjust the pH to a value of 9. The temperature of the reaction medium in the second step was maintained at 68° C.

A suspension containing an alumina precipitate was obtained.

The final concentration of alumina in question was 45 g/l, and the flow of aluminium sulphate $Al_2(SO_4)$ and sodium aluminate NaAlOO precursors containing aluminium introduced in the second precipitation step were 7.2 ml/min and 8.8 ml/min, respectively.

These flows of acid and basic precursors containing aluminium allowed a rate of progress of 28% to be achieved in the second precipitation step.

The suspension obtained then underwent an increase in temperature from 68 to 90° C.

The suspension then underwent a step for thermal treatment in which it was maintained at 90° C. for 60 minutes.

The suspension obtained was then filtered by water displacement on a fritted Buchner type device and the alumina gel obtained was washed 3 times with 5 l of distilled water at 70° C.

The length of filtration and the washes was 3 hours.

The characteristics of the alumina gel obtained in this way are summarised in Table 3.

TABLE 3

Characteristics of the alumina gel obtained according to Example 2.

| | Alumina gel according to Example 2 |
|---|---|
| Dispersibility index Ta = 10% (%) | 100 |
| Size (020) (nm) | 2.8 |
| Size (120) (nm) | 3.5 |
| Sodium Na (%) | 0.074 |
| Sulphur S (%) | 0.0364 |
| Filtration time | 3 hours |

A gel having a dispersibility index of 100% was obtained in this way.

The alumina gel was then dried by spray-drying with an inlet temperature of 250° C. and an outlet temperature of 130° C. The gel dried by spray-drying is referred to a Gel No 1.

The alumina gel obtained according to Example 3 was also dried in a ventilated oven at 35° C. for 4 days. The oven-dried gel is referred to as Gel No 2.

The dried alumina gels No's 1 and 2 were then respectively introduced into a Brabender type kneader. Water acidified with nitric acid having a total acid content of 3%, by weight in relation to the mass of the dried gel introduced into the kneader, was added in 5 minutes, during kneading at 20 revolutions/min. The acid kneading was continued for 15 minutes. A neutralisation step was then carried out by addition of an ammonium solution in the kneader, having a neutralisation content of 50%, by weight of ammonia in relation to the quantity of nitric acid introduced into the kneader for the acidification step. The kneading was continued for 3 minutes.

The paste obtained was then extruded through a three-lobed 2 mm nozzle. The extrudates obtained were dried at 100° C. overnight and then calcined for 2 hours at 600° C.

The characteristics of the alumina formed are given in Table 4:

TABLE 4

Characteristics of the aluminas AL-2 and AL-3 obtained according to example 2.

| | AL-2 | AL-3 |
|---|---|---|
| Type of drying | Spray-drying | 35° C. |
| $S_{BET}$ (m²/g) | 289 | 292 |
| VPT (Hg) (ml/g) | 0.68 | 0.69 |
| Vmacro (50-7000 nm) (Hg) (ml/g) | 2% | 3% |
| Vmeso (Hg) (ml/g) | 0.71 | 0.73 |
| V (2 < d < 8 nm) % | 26 | 21 |
| V (8 < d < 20 nm) % | 61 | 64 |
| V (20 < d < 50 nm) % | 3 | 4 |
| V (50 < d < 7000 nm) % | 2 | 3 |
| Z | 6.5 | 6 |
| Dp (nm) (Hg) | 9.7 | 9.8 |

Example 3

Preparation of Catalysts C1 (Non-Conforming), C2 (Conforming) and C3 (Conforming) from Alumina Supports AL-1, AL-2, and AL-3, Respectively Based on the alumina supports AL-1, AL-2, AL-3, in the form of extrudates, catalysts C1, C2 and C3, respectively, were prepared by adding nickel, molybdenum and phosphorous. The impregnation solution was prepared by hot dissolution of molybdenum oxide (21.5 g) and nickel hydroxide (5.4 g) in the phosphoric acid solution (8.2 g) in aqueous solution. Following dry impregnation of supports AL-1, AL-2 and AL-3 the extrudates were left to mature in a water-saturated atmosphere for 12 hours, and then dried overnight at 90° C. Calcination of the catalytic precursor at 450° C. for 2 hours led respectively to calcined catalysts C1, C2 and C3. The final composition of the catalysts C1, C2 and C3 expressed in oxide form was then as follows: $MoO_3$=21.5+/−0.2 (wt. %), NiO=4.3+/−0.1 (wt. %) and $P_2O_5$=5.0+/−0.1 (wt. %). The pore size distribution of the catalysts is shown in Table 5.

TABLE 5

Pore size distribution of C1, C2 and C3

| Pore size distribution | C1 (% VPT) | C2 (% VPT) | C3 (% VPT) |
|---|---|---|---|
| d <8 nm | 44 | 29 | 24 |
| 8 < d < 21 nm | 54 | 58 | 61 |
| 21 < d < 50 nm | 1 | 3 | 4 |
| 50 < d < 7000 nm | 1 | 2 | 3 |
| Vmeso (mL/g) | 0.38 | 0.39 | 0.40 |
| Vmacro (mL/g) | 0.01 | 0.02 | 0.02 |
| Dp at Vmeso/2 (nm) (Hg) | 11.3 | 9.6 | 9.7 |
| Z | 2.5 | 6.5 | 6.0 |

Example 4

Preparation of Catalysts C1' (Non-Conforming), C2' (Conforming) and C3' (Conforming) from Alumina Supports AL-1, AL-2 and AL-3, Respectively Based on the alumina supports AL-1, AL-2, AL-3, in the form of extrudates, catalysts C1', C2' and C3', respectively, were prepared by adding nickel, cobalt, molybdenum and phosphorous. The impregnation solution was prepared by hot dissolution of molybdenum oxide (18.0 g), cobalt carbonate (4.95 g) and nickel hydroxide (1.3 g) in the phosphoric acid solution (8.1 g) in aqueous solution. Following dry impregnation of supports AL-1, AL-2 and AL-3 the extrudates were left to mature in a water-saturated atmosphere for 12 hours, and then dried overnight at 90° C. Calcination of the catalytic precursor at 450° C. for 2 hours led respectively to calcined catalysts C1', C2', and C3'. The final composition of the catalysts C1', C2' and C3' expressed in oxide form was then as follows: $MoO_3$=18.0+/−0.2 (wt. %), NiO=1.0+/−0.1 (wt. %), CoO=3.1+/−0.1 (wt. %) and $P_2O_5$=4.9+/−0.1 (wt. %). The pore size distribution of the catalysts is shown in Table 6.

TABLE 6

Pore size distribution of catalysts C1', C2' and C3'

| Pore size distribution | C1' (% VPT) | C2' (% VPT) | C3' (% VPT) |
|---|---|---|---|
| d < 8 nm | 44 | 28 | 23 |
| 8 < d < 21 nm | 54 | 59 | 62 |
| 21 < d < 50 nm | 1 | 3 | 4 |
| 50 < d < 7000 nm | 1 | 2 | 3 |
| Vmeso (mL/g) | 0.46 | 0.43 | 0.42 |
| Vmacro (mL/g) | 0.01 | 0.02 | 0.02 |
| Dp (nm) (Hg) | 11.3 | 9.6 | 9.7 |
| Z | 2.5 | 6.5 | 6.0 |

Example 5

Assessment of the Catalytic Performances of Catalysts C1, C2 and C3 in Tests on Actual Feedstocks in the Case of a Process for Hydrotreatment of a Vacuum Distillate (VD) Feedstock Positioned Upstream of a Hydrocracking Unit Catalysts C1 (non-conforming), C2 (conforming) and C3 (conforming), previously described, were compared in the hydrotreatment of a vacuum distillate fraction.

Catalysts C1, C2 and C3 were previously sulphurised using a straight run type gasoil feedstock (density 0.863 g/cm³, 1 200 ppm of organic sulphur, 140 ppm nitrogen), with the addition of 4% of DMDS évolution®. The flow of said feedstock at the inlet to the reactor was 18 cm³/h (at 15° C.), the hydrogen flow at the inlet to the reactor was 19.8 NL/h, and the pressure was 140 bars (14 MPa) at the outlet. The reactor also underwent an increase in temperature under liquid and gas flow from ambient temperature to 350° C. at a rate of 12° C./h (level for 6 hours at 350° C.).

Test Conditions

The feedstock used was a vacuum distillate with a WAT of 474° C. (T5%=389° C., T50%=468° C., T70%=498° C.), and density of 0.9355 g/mL at 15° C., containing 2.23% of sulphur, 1 750 ppm nitrogen, including 500 ppm of basic nitrogen, and a refraction index of 1.5004. The boiling temperature of 5% of the feedstock was 370° C. and of 95% of the feedstock 550° C. The catalyst testing was carried out at reaction temperatures of 370° C., 380° C. and 390° C. following sulphurisation of the catalysts. The flow of feedstock at the inlet to the reactor was 18 cm³/h (at 15° C.), the hydrogen flow at the inlet to the reactor was 19.8 NL/h and the pressure was 140 bars (14 MPa) at the outlet. The test was carried out in a pilot reactor with 9 ml of catalyst. Following stabilisation of the reactor for approximately 150 hours at 370° C., the activity measurements were carried out at 380° C. and 390° C. with a stabilised system (over 100 h). The effluents were analysed for their organic nitrogen contents, density, refraction index and by simulated distillation. The values for aromatic carbon were obtained with the ASTM 3238-95 method known as n-d-M.

TABLE 7

Results of the catalytic tests

| | Organic nitrogen (ppm) | | | Aromatic carbon (%) | | |
|---|---|---|---|---|---|---|
| | 370° C. | 380° C. | 390° C. | 370° C. | 380° C. | 390° C. |
| C1 non-conforming | 304 | 145 | 50 | 10.2 | 9.3 | 8.3 |
| C2 conforming | 220 | 87 | 22 | 10.0 | 8.9 | 7.8 |
| C3 conforming | 232 | 91 | 27 | 10.1 | 9.0 | 7.9 |

Table 7 shows that surprisingly catalysts C2 and C3 conforming to the invention are more active than catalyst C1 (non-conforming). The table shows that with the use of catalyst C2 or catalyst C3, at the same test temperature the quantity of organic nitrogen in the effluents was lower than when catalyst C1 was used, and thus that catalysts C2 and C3 were more active in the hydrodeazotisation of vacuum distillate than catalyst C1. The table also shows that at the same test temperature the effluents resulting from the testing of catalyst C2 or catalyst C3 contained a lower proportion of aromatic carbon than when catalyst C1 was used, and thus that catalysts C2 and C3 were more active in hydrogenation of vacuum distillate than catalyst C1.

Example 6

Assessment of the Catalytic Performances of Catalysts C1', C2' and C3' in Tests on Actual Feedstocks in the Case of a Process for Hydrotreatment of a Vacuum Distillate (VD) Feedstock Positioned Upstream of a Fluidised Bed Hydrocracking Unit Catalysts C1' (non-conforming), C2' (conforming) and C3' (conforming), previously described, were compared in the hydrotreatment of a vacuum distillate fraction.

Catalysts C1', C2' and C3' were previously sulphurised using a straight run type gasoil feedstock (density 0.863 g/cm³, 1 200 ppm of organic sulphur, 140 ppm nitrogen), with the addition of 4% of DMDS évolution®. The flow of said feedstock at the inlet to the reactor was 9 cm³/h (at 15° C.), the hydrogen flow at the inlet to the reactor was 2.25 NL/h, and the pressure was 65 bars (6.5 MPa) at the outlet. The reactor also underwent an increase in temperature under liquid and gas flow from ambient temperature to 350° C. at a rate of 12° C./h (level for 6 hours at 350° C.).

Test Conditions

The feedstock used was a vacuum distillate with a WAT of 474° C. (T5%=389° C., T50%=468° C., T70%=498° C.), and density of 0.9355 g/mL at 15° C., containing 2.23% of sulphur, 1 750 ppm nitrogen, including 500 ppm of basic nitrogen, and a refraction index of 1.5004. The boiling temperature of 5% of the feedstock was 370° C. and of 95% of the feedstock 550° C. The catalyst testing was carried out at reaction temperatures of 360° C., 375° C. and 390° C. following sulphurisation of the catalysts. The flow of feedstock at the inlet to the reactor was 9 cm³/h (at 15° C.), the hydrogen flow at the inlet to the reactor was 2.25 NL/h and the pressure was 65 bars (6.5 MPa) at the outlet. The test was carried out in a pilot reactor with 9 ml of catalyst. Following stabilisation of the reactor for approximately 150 hours at 360° C., the activity measurements were carried out at 375° C. and 390° C. with a stabilised system (over 100 h). The effluents were analysed for their residual sulphur and organic nitrogen contents in the effluents.

TABLE 8

Results of the catalytic tests

| | Organic sulphur (ppm) | | | Organic nitrogen (ppm) | | |
|---|---|---|---|---|---|---|
| | 360° C. | 375° C. | 390° C. | 360° C. | 375° C. | 390° C. |
| C1' non-conforming | 990 | 374 | 120 | 809 | 575 | 360 |
| C2' conforming | 820 | 294 | 91 | 743 | 515 | 302 |
| C3' conforming | 825 | 305 | 98 | 758 | 528 | 310 |

Table 8 shows that surprisingly catalyst C2' (conforming to the invention) and catalyst C3' (conforming to the invention) are more active than catalyst C1' (non-conforming). The table shows that at the same test temperature the quantity of organic sulphur in the effluents from the testing of catalysts C2' and C3' was lower than when catalyst C1' was used, and thus that catalysts C2' and C3' were more active in the hydrodesulphurisation of vacuum distillate than catalyst C1'. The table also shows that at the same test temperature the effluents resulting from the testing of catalyst C2' or catalyst C3' contained a lower proportion of organic nitrogen than when catalyst C1' was used, and thus that catalysts C2 and C3 were more active in hydrogenation of vacuum distillate than catalyst C1'.

The invention claimed is:

1. A process for hydrotreatment of at least one liquid hydrocarbon feedstock having a weighted average temperature of more than 380° C., said process comprising:
   hydrotreating said liquid hydrocarbon feedstock at a temperature of between 250° C. and 430° C., at a total pressure of between 4 MPa and 20 MPa, with a ratio of volume of hydrogen to volume of liquid hydrocarbon feedstock of between 200 and 2,000 liters per liter and at an Hourly Volume Velocity, defined by the ratio of the volume flow of liquid hydrocarbon feedstock to the volume of catalyst fed into the reactor, of between 0.5 and 5 h−1,
   wherein said hydrotreating is performed in the presence of at least one catalyst containing at least one metal from Group VIB and/or at least one metal from Group VIII of the periodic table and a support containing an amorphous mesoporous alumina,
   wherein said amorphous mesoporous alumina is prepared by a method comprising the following steps:
   a) in a first alumina precipitation step a), precipitating alumina in an aqueous reaction medium containing at least one basic precursor selected from sodium aluminate, potassium aluminate, ammonia, sodium hydroxide and potassium hydroxide and at least one acid precursor selected from aluminum sulphate, aluminum chloride, aluminum nitrate, sulphuric acid, hydrochloric acid, and nitric acid, wherein at least one of the basic or acid precursors comprises aluminum, the relative flows of the acid and basic precursors is selected to obtain a pH of the reaction medium of between 8.5 and 10.5 and the flow of the acid and basic precursor(s) containing aluminum is adjusted to obtain a rate of progress of the first alumina precipitation step a) of between 45 and 90%, the rate of progress being defined as being the alumina formed as equivalent $Al_2O_3$ in said first alumina precipitation step a) as a proportion of the total quantity of alumina formed in the method, said first alumina precipitation step a) operating at a temperature of between 20 and 40° C., and for a period of between 2 minutes and 30 minutes, wherein said first alumina precipitation step a) produces a suspension,
   aa) a first heating step wherein the suspension from step a) is heated at a temperature of between 20 and 90° C. for a period of between 7 and 45 minutes,
   a') in a second alumina precipitation step a'), precipitating alumina in an aqueous reaction medium containing at least one basic precursor selected from sodium aluminate, potassium aluminate, ammonia, sodium hydroxide and potassium hydroxide and at least one acid precursor selected from aluminum sulphate, aluminum chloride, aluminum nitrate, sulphuric acid, hydrochloric acid, and nitric acid, wherein at least one of the basic or acid precursors comprises aluminum, the relative flow of the acid and basic precursors is selected to obtain a pH of the reaction medium of between 8.5 and 10.5 and the flow of the acid and basic precursor(s) containing aluminum is adjusted to obtain a rate of progress of the second alumina precipitation step a') of between 10 and 55%, the rate of progress being defined as being the alumina formed as equivalent $Al_2O_3$ in said second alumina precipitation step a') as a proportion of the total quantity of alumina formed in the method, said step a') operating at a temperature of between 40 and 90° C., and for a period of between 2 minutes and 30 minutes, wherein the step a') produces a suspension,
   a'a') a second heating step wherein the suspension from step a') is heated at a temperature of between 50 and 95° C.,
   b) in a thermal treatment step, heating the suspension obtained in step a'a') at a temperature of between 50 and 200° C. for a period of between 30 minutes and 5 hours,
   c) in a filtration step, filtering the suspension obtained from thermal treatment step b) wherein an alumina gel is obtained, followed by at least one washing of the gel obtained,
   d) in a drying step, drying the alumina gel obtained in step c) to obtain a powder,
   e) in a shaping step, shaping the powder obtained in step d) to obtain a raw material, and
   f) in a further thermal treatment step, heating the raw material obtained in step e) at a temperature of between 500 and 1000° C., in the presence or not of an air flow containing up to 60 vol. % of water.

2. The process according to claim 1, wherein said amorphous mesoporous alumina has a connectivity of more than 2.7, the connectivity being determined on the basis of the nitrogen adsorption/desorption isotherms.

3. The process according to claim 1, wherein said liquid hydrocarbon feedstock is a vacuum distillates, an effluent produced by a Fluid Catalytic Cracking unit, a light cycle oil produced in a catalytic cracking unit, a heavy cycle oil, a paraffin effluent produced by Fischer-Tropsch synthesis, an effluent produced by vacuum distillation, an effluent produced by coal liquefaction processes, a feedstock from biomass or an effluent resulting from the conversion of feedstocks from biomass, or an aromatic extract or a feedstock from an aromatic extraction unit, alone or in a mixture.

4. The process according to claim 1, wherein the Group VIII elements are cobalt and nickel, alone or in a mixture.

5. The process according to claim 1, wherein the Group VIB elements are tungsten and molybdenum, alone or in a mixture.

6. The process according to claim 1, wherein said amorphous mesoporous alumina has a connectivity of between 3 and 7.

7. The process according to claim 1, wherein said hydrotreatment process is implemented upstream of a unit for hydrocracking of said liquid hydrocarbon feedstock.

8. The process according to claim 7, wherein said hydrotreatment process is conducted at a temperature of between 350 and 430° C. and at a total pressure of between 8 MPa and 20 MPa.

9. The process according to claim 7, wherein said hydrotreatment process is conducted at a temperature of between 350 and 405° C. and at a total pressure of between 9 MPa and 15 MPa, with a ratio of volume of hydrogen to volume of liquid hydrocarbon feedstock of between 500 and 1,200 liters per liter and at an Hourly Volume Velocity, defined by the ratio of the volume flow of liquid hydrocarbon feedstock to the volume of catalyst fed into the reactor, of between 1 and $3h^{-1}$.

10. The process according to claim 1, wherein said hydrotreatment process is implemented upstream of a unit for fluidized bed catalytic cracking of said liquid hydrocarbon feedstock.

11. The process according to claim 10, wherein said hydrotreatment process is conducted at a temperature of between 250 and 420° C. and at a total pressure of between 4 MPa and 15 MPa.

12. The process according to claim 10, wherein said hydrotreatment process is conducted at a temperature of between 340° C. and 400° C. and at a total pressure of between 4 MPa and 12 MPa, with a ratio of volume of hydrogen to volume of liquid hydrocarbon feedstock of between 250 and 800 liters per liter and at an Hourly Volume Velocity, defined by the ratio of the volume flow of liquid hydrocarbon feedstock to the volume of catalyst fed into the reactor, of between 0.7 and 2 $h^{-1}$.

13. The process according to claim 1, wherein said support used in the catalyst has the following pore size distribution, measured by mercury porosimetry:
the percentage volume included in the pores of a size between 2 and 8 nm in relation to the total pore volume, is between 20 and 40%,
the percentage volume included in the pores of a size between 8 and 20 nm in relation to the total pore volume, is between 50 and 65%,
the percentage volume included in the pores of a size between 20 and 50 nm in relation to the total pore volume, is less than 10%, and
the percentage volume included in the pores of a size between 50 and 7 000 nm in relation to the total pore volume, is less than 10%.

14. The process according to claim 1, wherein said amorphous mesoporous alumina has a mesopore volume measured by mercury porosimetry of between 0.6 and 0.8 ml/g.

15. The process according to claim 1, wherein said support used in the catalyst has the following pore size distribution, measured by mercury porosimetry:
the percentage volume included in the pores of a size less than 8 nm in relation to the total pore volume, is between 20 and 40%,
the percentage volume included in the pores of a size between 8 and 20 nm in relation to the total pore volume, is between 40 and 65%,
the percentage volume included in the pores of a size between 20 and 50 nm in relation to the total pore volume, is less than 10%, and
the percentage volume included in the pores of a size between 50 and 7 000 nm in relation to the total pore volume, is less than 10%.

16. The process according to claim 1, wherein said catalyst has a mesopore volume measured by mercury porosimetry of between 0.1 and 0.6 ml/g.

17. The process according to claim 1, wherein said hydrotreatment process is conducted at a temperature of between 350° C. and 405° C. and at a total pressure of between 6 MPa and 15 MPa, with a ratio of volume of hydrogen to volume of liquid hydrocarbon feedstock of between 250 and 1,400 liters per liter and an Hourly Volume Velocity, defined by the ratio of the volume flow of liquid hydrocarbon feedstock to the volume of catalyst fed into the reactor, of between 0.7 and 3 $h^{-1}$.

18. The process according to claim 1, wherein said amorphous mesoporous alumina has a connectivity of between 2.7 and 10, the connectivity being determined on the basis of the nitrogen adsorption/desorption isotherms.

19. The process according to claim 1, wherein said basic and acid precursors are sodium aluminate and aluminium sulphate, respectively, and the mass ratio of said basic precursor to said acid precursor is between 1.6 and 2.05.

20. The process according to claim 1, wherein said first alumina precipitation step a) is performed at a pH of between 8.7 and 9.9.

21. The process according to claim 1, wherein the rate of progress of said first alumina precipitation step a) is between 50 and 85%.

22. The process according to claim 1, wherein said first alumina precipitation step a) is carried out for a period of between 5 and 20 minutes.

23. The process according to claim 1, wherein thermal treatment step b) is performed at a temperature of between 65 and 150° C.

24. The process according to claim 1, wherein thermal treatment step b) is performed at a temperature of between 65 and 130° C. for a period of between 40 minutes and 5 hours.

25. The process according to claim 1, wherein thermal treatment step b) is performed at a temperature between 70 and 110° C. for a period of between 40 minutes and 3 hours.

26. The process according to claim 1, wherein thermal treatment step b) is performed at a temperature between 70 and 95° C. for a period of between 45 minutes and 2 hours.

27. The process according to claim 1, wherein said first heating step aa) performed at a temperature of between 30 and 80° C.

28. The process according to claim 1, wherein said second alumina precipitation step a') is performed at a pH of between 8.7 and 9.9.

29. The process according to claim 1, wherein said second alumina precipitation step a') is performed at a temperature of between 45 and 70° C. for a period of between 5 and 45 minutes.

30. The process according to claim 1, wherein said second alumina precipitation step a') is performed at a temperature of between 50 and 70° C. for a period of between 7 and 40 minutes.

31. The process according to claim 1, wherein said further thermal treatment step f) is performed at a temperature of between 540° C. and 850° C. for a period of between 2 h and 10 h.

* * * * *